F. W. EDWARDS.
SIGHT FEED FOR LUBRICATORS.
APPLICATION FILED AUG. 24, 1908.
952,611.
Patented Mar. 22, 1910.
2 SHEETS—SHEET 1.
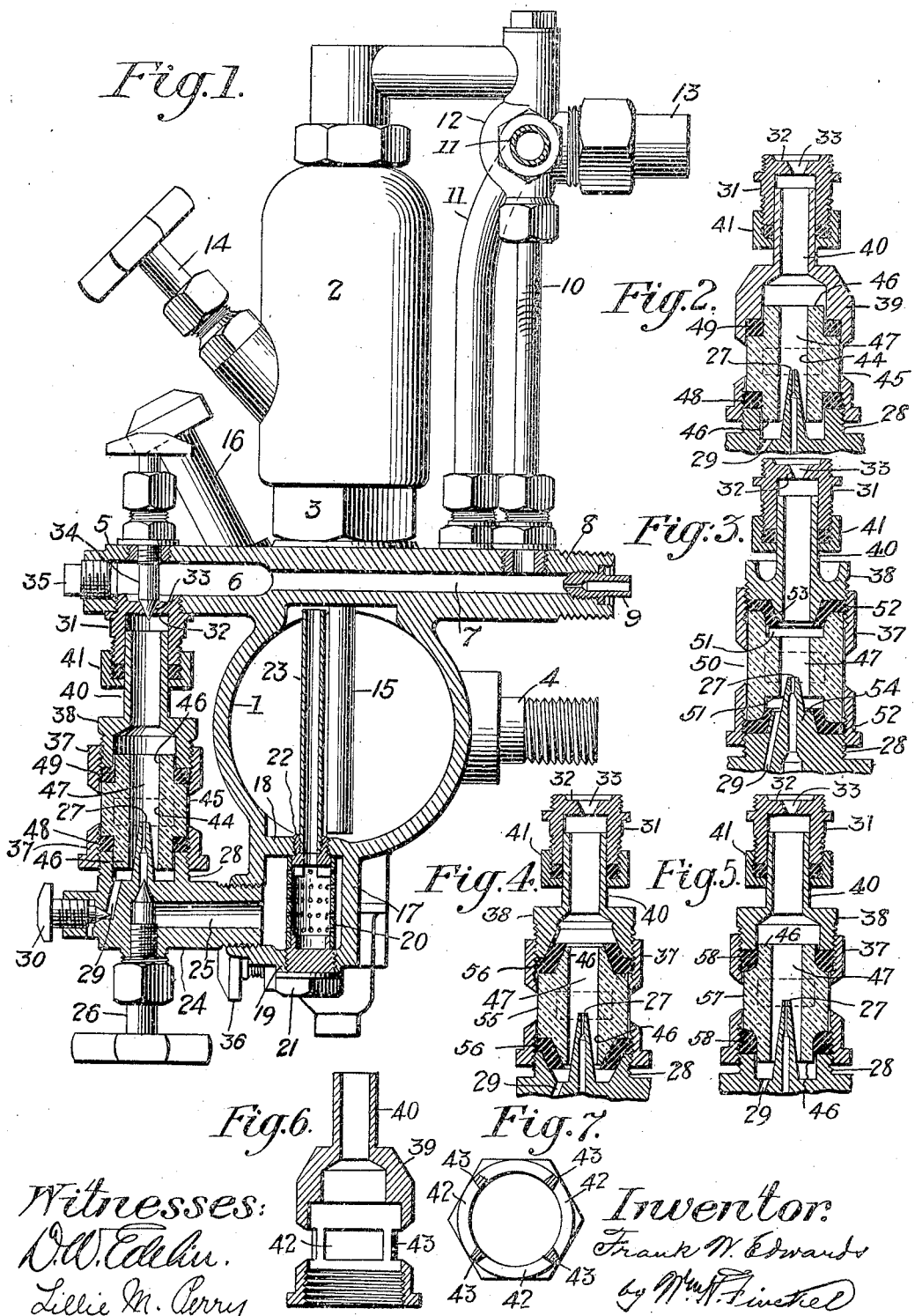

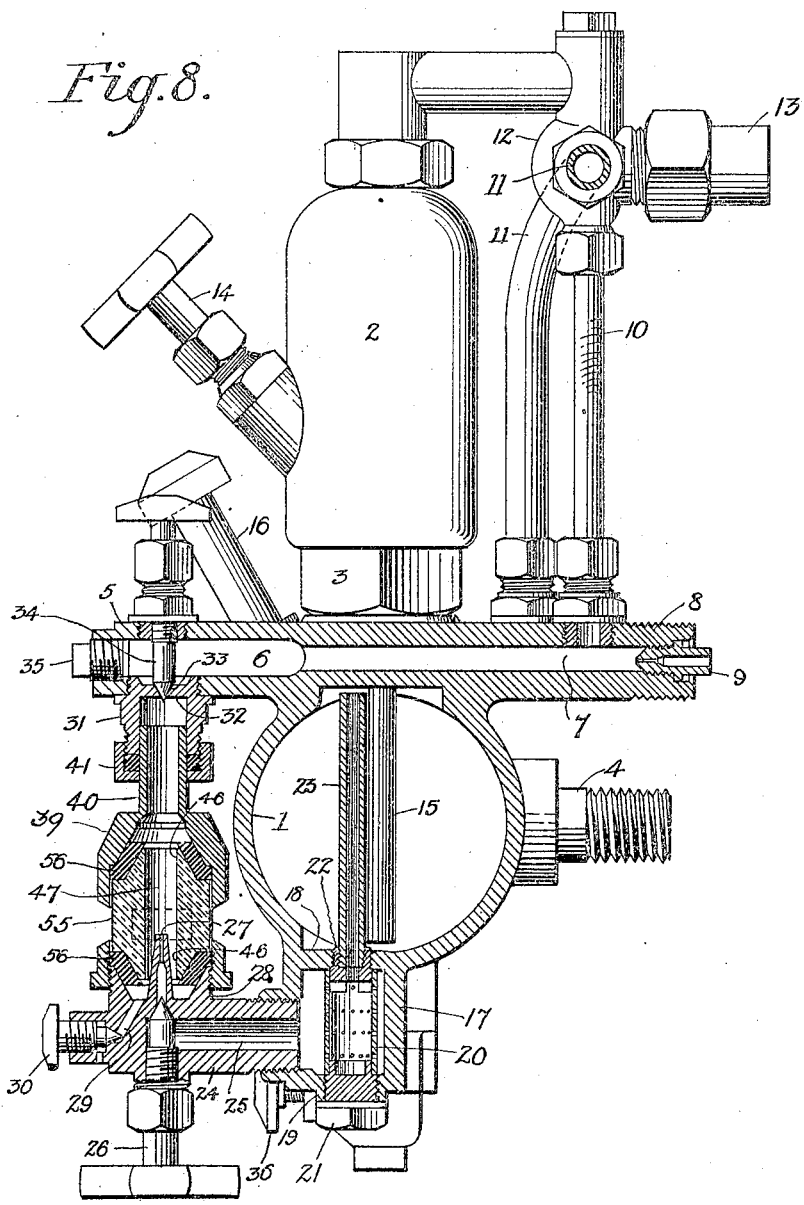

UNITED STATES PATENT OFFICE.

FRANK W. EDWARDS, OF LOGANSPORT, INDIANA, ASSIGNOR TO THE CHICAGO LUBRICATOR COMPANY, OF CHICAGO, ILLINOIS, A CORPORATION OF ILLINOIS.

SIGHT-FEED FOR LUBRICATORS.

952,611.   Specification of Letters Patent.   Patented Mar. 22, 1910.

Application filed August 24, 1908.   Serial No. 450,093.

*To all whom it may concern:*

Be it known that I, FRANK W. EDWARDS, a citizen of the United States, residing at Logansport, in the county of Cass and State of Indiana, have invented a certain new and useful Improvement in Sight-Feeds for Lubricators, of which the following is a full, clear, and exact description.

An essential requirement in a sight-feed lubricator is that it shall permit such observations of the feed that the operator may determine whether the lubricator is feeding with the required regularity. To this end sight-feed lubricators have always been constructed with sight-feed chambers through which the oil passes drop by drop, the whole or some portion of the walls of these chambers being of glass. These glasses are usually called "observation glasses" and have been of two general types. In one of these types the glass is in the form of a tube of uniform diameter and having walls of uniform thickness, the oil passing through the tube. It is highly important that the sight-feed chamber should be so located as to be readily observable from various points of view about the lubricator, and more important still that its interior should be subjected to light and that its interior should be illuminated by the light coming from various directions and passing through the transparent walls of the chamber. This facility of observation has been secured in the old well-known tubular glass which is held at its ends in supporting arms usually provided with packing. While this form of glass was ideal in that it was so placed that the feed of oil could be observed from various positions, and also in that it permitted the light to enter the chamber from various directions thus affording perfect illumination on the lubricator, yet it has certain inherent and radical defects which have never been overcome and for which heretofore no remedy has been proposed. These defects arose from the frequent breakage due to the fragile character of the tube itself, no such glass having been heretofore constructed of sufficient strength to withstand the internal steam pressures and the strains due to the variation of temperature and the getting out of line of the mountings. These glasses frequently broke, thus putting the lubricator out of service, and the danger from flying particles of glass was so serious as to cause the use of wire guards around the glasses, thus adding to the expense and interfering with ready observation. The other type of glasses is known as the bull's-eye. These glasses are invariably mounted in pockets, usually of metal, and fitted into the side walls of the sight-feed chambers. These glasses are solid and usually of greater axial length than diameter. The pockets or chambers containing the glasses are usually arranged in pairs, being placed in line with each other on opposite sides of the sight feed chamber. These glasses largely overcome the liability of breakage, but they do not afford ready observation from different points, having, in fact, only small areas exposed to the light and being for the most part surrounded by solid walls; and they cannot always be so placed as to permit the light to enter through both glasses or from opposite sides of the chamber. Further these glasses are so thick and their exposed areas so limited that they do not afford good illumination, and with turbid water the feed of the oil cannot be observed readily. These objections are so pronounced that it is generally recognized that the bull's-eye type of glass affords less facility for correct observation of the feed of the oil than the tubular glass, but these bull's-eyes have been and are used because of their avoidance of the objections to tubular glasses above stated.

The object of my invention is to secure all of the advantages without the defects of both forms of glasses above mentioned, and to insure complete illumination and perfect observation, together with necessary strength and safety.

The generic invention is illustrated and claimed in a concurrent application of even date herewith, Serial No. 450,096, and the present invention illustrates several species of that invention, other species being illustrated also in two other concurrent cases Serial Nos. 450,094 and 450,095.

The invention herein consists principally in a reinforced observation glass for lubricators, having a central longitudinal oil passage, and a two-part or one-part packing-case in which the glass is contained, the portion of the glass exposed through such case being of greater thickness than its ends in order to withstand all ordinary pressures, strains, and shocks, and having its ends variously formed and of reduced thickness relatively to the central portion, to receive suitable gaskets by which it is cushioned and held in its case and in the supports for the case between the upper and lower feed-arms of the lubricator.

In the accompanying drawings, illustrating the invention, in the several figures of which like parts are similarly designated, Figure 1 is a vertical section, some parts in elevation, of a preferred form of sight-feed condensation displacement lubricator, the section being drawn through the sight-feed for the air-pump lubricating connection and showing one form of reinforced observation glass and gaskets. Fig. 2 is a longitudinal section of the sight-feed elements detached and showing a one-piece packing-case or metallic container for the glass. Figs. 3, 4 and 5 are longitudinal sections, illustrating various forms of glasses and gaskets. Fig. 6 is a longitudinal section of the packing case of Fig. 2. Fig. 7 is a horizontal cross-section of the packing-case illustrating each of the various kinds of packing-cases. Fig. 8 is a view similar to Fig. 1, but showing the integral packing case, and the glass and packing of Fig. 4.

For illustration and without thereby limiting the invention, I have shown a horizontally arranged cylindrical oil-bowl 1, upon which is arranged a condenser 2, which may be cast with the oil-bowl or applied to it through the medium of a screwthreaded nipple on the bowl engaged by the nut-like end 3 of the condenser. The oil-bowl is provided with an integral attaching-lug 4. At the top of the oil-bowl and cast integral therewith are the upper feed-arms 5, as many in number as there are parts to be lubricated, and all of substantially the same construction as the one shown. This feed-arm has the internal passage 6 opening into the passage 7 of the oil pipe connection 8, which may have the choke-plug 9 in it. The passages described are supplied with steam through pipes 10 and 11, which lead, for example, to the air-pump and the two engine cylinders respectively. These pipes are attached to a casting 12 which is connected with the condenser and has a boiler connection 13 for supplying steam to the apparatus. The condenser has a valve 14 for controlling its outflow through pipe 15 into the oil-bowl, and the latter has a filling-plug 16. The oil-bowl has a pocket 17 integral with its bottom and separated from it by a partition 18. This pocket has a bottom opening 19 through which is inserted a cylindrical strainer 20 whose perforations are smaller than the bore of the oil feed-tip. This strainer is supported in the pocket by a cap nut 21 screwed into the opening 19 and by a nut 22 screwed in a hole in the partition 18, and this nut 22 also receives and supports the oil feed pipe 23 rising to near the top of the oil-bowl.

The lower feed-arm 24 is screwed into the pocket and has the feed passage 25 which is intersected by an oil feed valve 26 seated in the upper wall of the lower feed-arm in line with the feed-tip 27, and the upper wall of said feed-arm is supplied with an integral hub 28 which surrounds the base of the feed-tip and forms with it a pocket which is drained by channel 29 and valve 30. The upper feed-arm 5 has an attached hub 31 provided with a partition 32 having a hole 33 in it, which forms a seat for the valve 34 which controls the inflow of steam and the outflow of oil. This feed-arm 5 is also provided with an end opening closed by a plug 35, which may be replaced by an auxiliary oil-cup should the feed become deranged. The oil-bowl may be provided with a draining-valve 36. All of the parts so far described in detail may be of approved construction, and some of them form parts of the invention of the generic case before mentioned.

To avoid repetition, the packing device of whatever character will be referred to herein as a gasket, and some of the forms of gaskets herein described are new.

Two forms of packing-cases are herein shown, one of which, as shown in Figs. 1, 3, 4 and 5, is composed of two parts, namely, the case proper, 37, and the packing-nut 38, and the other is composed of a single part 39, as shown in Figs. 2 and 6, and both forms are represented in Fig. 7. Both forms of packing-case are provided with tubular extensions 40 for effecting a slip-joint connection with the upper feed-arm hub 31, through the medium of the packing-nut 41. These packing-cases are designed for use with reinforced observation glasses of various constructions, four of which are shown herein and others in one of the companion cases referred to.

The two-part packing-case is screwthreaded internally at top and bottom for connection respectively with the packing-nut 38 and the hub 28 on the lower feed-arm, and it is provided with any desired number of openings 42 through which the glass and consequently the feed, are observable from many points of vision and whereby the feed is illuminated all around. These openings are separated by the smallest possible strips 43 consistent with strength.

The reinforced observation glass 44 has a thick walled central portion 45 arranged externally as in Figs. 1, 2, 4 and 5, or internally as in Fig. 3, and symmetrical ends 46 of reduced external diameter as in Figs. 1, 2, 4 and 5 or reduced internally as in Fig. 3, to form shoulders on the glass for the reception of the gaskets, four different forms of which are herein shown. The glasses are provided with longitudinal oil passages 47, herein also referred to as a throughbore. As shown, the glass has its thick walled central portion arranged opposite the openings in the packing-case so as to expose its portion of greatest strength and resistance.

In Fig. 1 the glass is arranged between the upper and lower feed-arms and rests upon a gasket 48 interposed between its lower shouldered end and the edge of the hub 28, and upon a similar gasket 49 interposed between its upper shouldered end and the edge of the packing-nut, so that when the packing-case is screwed to the hub on the lower feed-arm and the packing-nut has been screwed down into the packing-case enough pressure is placed upon the gaskets to firmly hold the glass in place and effect tight joints therewith, and at the same time the glass is nowhere in direct contact with the surrounding metal which supports it, and hence is allowed ample space for expansion in use.

As compared with the construction of the packing-case of the generic case wherein an internal flange is used, the omission of such flange involves the omission of one gasket and thus the manufacture and assembling of the parts are simplified and cheapened.

In the construction shown in Fig. 3, the glass 50 has a uniform external diameter and its ends are rabbeted or countersunk interiorly as at 51, and the gaskets 52 at top and bottom are large enough to cover the ends of the glass and extend between the sides of the countersunk portion and an internal teat 53 of the packing-nut and the enlargement 54 on the base of the feed-tip. The gaskets in this case are complementally alike, and are of two diameters and provide a double contact on the glass. The teat 53 and the corresponding base 54 of the feed-tip afford shoulders between which and the countersunk portions of the glass the gaskets are pressed.

In Fig. 4 the glass 55 has beveled ends, and the packing-nut and the hub are correspondingly beveled, and between these surfaces are placed gaskets 56 which are approximately truncated cones with base flanges in cross-section. In this construction the gaskets afford a double cushion for the glass and the glass is thereby kept clear of all metallic contact.

In Fig. 5 the glass 57 has its ends chamfered and provided with curved shoulders in which are placed packing-rings or gaskets 58 of corresponding contour, or capable of taking on such contour under pressure. In this construction the curvatures, as distinguished from angles, afford strength at these points and overcome any defect that may be developed in making the glass. If the gaskets are shaped accordingly, the packing and application of the glass are greatly facilitated.

In all of these various constructions there are the essentials of the inclosing and protecting case with many openings for the passage of the light and for inspection of the feed; the strong, reinforced glasses, and the gaskets interposed between the glass and the metal to effect steam, oil and water-tight joints; and there are also present, equally in each of them, facilities for dismembering the parts for repair and other purposes.

In the forms of sight-feeds shown in Figs. 1, 2, 4 and 5, the construction and arrangement are such that there is a two-place or double contact for each gasket, one contact on the reduced or upper cylindrical portion of the glass and the other on the shoulder formed by the junction of the reduced diameter and the greater diameter of the glass.

The shouldered ends of the glasses shown in Figs. 3, 4 and 5 differ from the ends shown in Figs. 1 and 2 in not being made right angular in cross-section, but tapering, and they may be described generically as slanting, and they are merely some of many forms that are adapted for use with gaskets of irregular cross-section.

In Figs. 2 and 6 the packing-case and the packing-nut are made integral. The gain in this construction as compared with the two-part construction is that one screw-threaded joint is avoided, and hence the cutting of two screw-threads. The construction is by this much simplified. In using this construction the relation of the upper feed-arm hub and the tubular extension of the packing-case is such that said hub may be unscrewed from the feed-arm and slid down over the tubular extension, and then the packing-case can be unscrewed from the lower feed-arm hub and the parts removed.

In using the two-part packing-case the packing-nut is unscrewed from it and then the packing-case is unscrewed from the hub 28 and thus the parts are left free to be taken out, repaired, removed or replaced as necessary. The gaskets form cushions between the glass and the metal and thus serve to protect the glass from being chipped or crushed when the metal expands, and they are of sufficient elasticity to yield under contraction and maintain tight joints.

In all of the various forms of these reinforced observation glasses, special attention has been given to illumination and to their packing in metallic cases or containers in order to insure a perfect seal of the glass on the feed-arms and the packing-nuts and at the same time permit free expansion in any direction and yet retain tight joints. There is interchangeability of the various glasses and the two forms of packing-cases, by making obvious changes in the packing-cases, and, further, the glasses and gaskets are applicable to the construction shown in another concurrent case Serial No. 450,095 wherein the feed-arms are modified to constitute a container for them.

What I claim is:—

1. A reinforced observation glass for lubricators, combined with a packing-case therefor having sight openings to permit a limited exposure of the glass, said glass being tubular and having a thick-walled central portion exposed at the openings in the packing-case and its opposite ends reduced and shouldered, and gaskets interposed between the packing-case and glass and received and retained upon the reduced and shouldered ends of the glass.

2. A reinforced observation glass for lubricators, a packing-case therefor having sight openings to permit a limited exposure of the glass, said glass being tubular and having a thick-walled central portion exposed at the openings in the packing-case and its opposite ends reduced and shouldered, and gaskets interposed between the packing-case and glass and received and retained upon the reduced and shouldered ends of the glass and engaging the glass at two places, combined with the upper and lower feed-arms of the lubricator, said packing-case interposed between and connected with these feed-arms and retaining the gaskets in engagement with the glass.

3. A sight-feed for lubricators, having a packing case provided with sight openings and a tubular extension in one piece therewith, a reinforced observation glass having a through-bore for the passage of the oil and its walls thickened where exposed in the sight openings and its ends reduced and shouldered, and gaskets interposed between the case and the ends of the glass and adapted to be combined with the upper and lower feed-arms of the lubricator, the aforesaid packing-case interposed between these feed-arms and bearing directly upon said gaskets and forcing each of them into contact at two places with the glass.

4. In a sight-feed for lubricators, a reinforced observation glass having its walls thicker at its middle portion than at its ends and having a longitudinal oil passage and reduced and slanting ends provided with shoulders to receive and retain the gaskets, combined with gaskets of complemental irregular cross-section applied to these ends and having contact therewith at two places, and means to secure the glass and its gaskets to the lubricator.

In testimony whereof I have hereunto set my hand this 21st day of August A. D. 1908.

FRANK W. EDWARDS.

Witnesses:
WILLIAM S. FURRY,
GEORGE M. DICKSON.